United States Patent [19]

Blackwell

[11] 3,799,454

[45] Mar. 26, 1974

[54] PREPARATION OF ARYLENE SULFIDE POLYMER COATING DISPERSION CONTAINING FLUOROCARBON POLYMER

[75] Inventor: Jennings P. Blackwell, Bartlesville, Okla.

[73] Assignee: Phillips Petroleum Company, Bartlesville, Okla.

[22] Filed: Dec. 21, 1972

[21] Appl. No.: 317,158

[52] U.S. Cl. .................................................. 241/16
[51] Int. Cl. ............................................. B02c 19/00
[58] Field of Search ...................................... 241/16

[56] References Cited
UNITED STATES PATENTS 3,499,784  3/1970  Bentholm et al. ............... 241/16 X
3,754,712  8/1973  Cecil ................................... 241/16

*Primary Examiner*—Granville Y. Custer, Jr.

[57] ABSTRACT

A coating composition is produced by first milling particulate arylene sulfide in a liquid such as water with a non-ionic surface active agent to produce a dispersion and thereafter mixing this dispersion with a fluorocarbon polymer dispersion comprising particulate fluorocarbon polymer charged particles in a liquid such as water.

10 Claims, No Drawings

PREPARATION OF ARYLENE SULFIDE POLYMER COATING DISPERSION CONTAINING FLUOROCARBON POLYMER

BACKGROUND OF THE INVENTION

This invention relates to the preparation of arylene sulfide polymer coating compositions containing fluorocarbon polymer.

Arylene sulfide polymers are known for their desirable characteristics as coating compositions as shown for instance by Ray U.S. Pat. No. 3,492,125. It has been found that in some cases it is preferred to incorporate a fluorocarbon polymer with the arylene sulfide polymer coating composition. While fluorocarbon polymer dispersions in water can be readily obtained comprising very small particle size polymer having an electrical charge, simple addition of arylene sulfide polymer to such a dispersion requires several days intensive milling time to produce a satisfactory coating composition.

BRIEF SUMMARY OF THE INVENTION

It is an object of this invention to provide an arylene sulfide polymer coating composition containing fluorocarbon polymer.

It is a further object of this invention to provide a method for incorporating arylene sulfide polymer and fluorocarbon polymer into a coating composition without the necessity for extended milling.

In accordance with this invention, a dispersion of particulate arylene sulfide polymer is formed in water with a non-ionic surface active agent thereafter mixed with a dispersion of charged fluorocarbon polymer particles in a liquid such as water.

DESCRIPTION OF THE PREFERRED EMBODIMENTS

The fluorocarbon dispersion is preferably formed by polymerization with an initiator and an emulsifier to give negatively charged particles in an aqueous colloidal dispersion. This dispersion is then stabilized with a non-ionic surfactant. Such fluorocarbon resin dispersions are sold under trademarks such as Teflon 30-B, Teflon 30, Teflon 42, Fluon GP-1, and Fluon GP-2. Alternatively a dispersion can be formed from a fine powder of any solid fluorocarbon polymer by mixing with an anionic or cationic surfactant.

The invention is applicable to the production of coating compositions utilizing any arylene sulfide polymer although the preferred polymer is poly(phenylene sulfide) having a melting or softening point of at least 300°F preferably 400°F to 850°F.

The poly(arylene sulfide) must first be formed as a dispersion in a suitable liquid such as water. The arylene sulfide polymer must be in particulate form. Generally polymer having a particle size of 40 mesh or smaller is preferred although satisfactory results can be obtained with coarser material, for instance 30 mesh or smaller. In this particulate material is then formed as a dispersion in a suitable liquid such as water by means of intensive milling. This milling will generally reduce the arylene sulfide polymer particle size with the final particle size generally being below 100 mesh (standard U.S. sieve series), although for most part the effect of the milling is to break up agglomerates rather than to reduce the particle size of the components drastically.

The intensive milling used in forming the arylene sulfide polymer dispersion can be accomplished by the use of a conventional ball mill, a conventional rod mill, or a vibratory ball mill. Balls or rods can be made of steel, ceramic materials made of burundum (a high-fired ceramic) and the like. If the particle size of the arylene sulfide polymer is small enough it is also possible to produce the dispersion utilizing a high intensity impeller type mixer such as a Waring blender. The milling time will generally be in the range of 5 to 40, preferably 10 to 25 hours, using a ball mill. With a vibratory ball mill the times can be about 1/10th that of the regular ball mill.

Generally a pigment or filler will be present in the coating composition. It is essential in such cases to incorporate the pigment with the arylene sulfide polymer in forming the dispersion in the intensive milling step. The pigment or filler can be the same particle size as the arylene sulfide polymer. Preferred pigments are titanium dioxide and black iron oxide. Particularly suitable are combinations of titanium dioxide and iron oxide. Other suitable pigments include red iron oxide, brown iron oxide, carbon black and zinc oxide. Suitable fillers include materials such as silica and talc.

It is essential that a non-ionic surface active agent be included in forming the dispersion of the arylene sulfide polymer in a liquid. Suitable non-ionic surface active agents include ethoxylated alkylphenols, ethoxylated aliphatic alcohols, carboxylic esters, carboxylic amides, and polyoxyalkylene oxide block copolymers. Preferred materials are alkylphenoxypoly(ethyleneoxy)ethanol. Exemplary of such materials is the material sold by Rohm and Haas under the trademark Triton X-100 wherein the alkyl is t-octyl and the mols of ethylene oxide is within the range of 9–10. The amount of non-ionic surface active agent present in the arylene sulfide polymer dispersion will vary from 0.5 to 15, preferably 2 to 8 weight percent based on the weight of the liquid.

Ratio of arylene sulfide polymer to liquid used in forming the initial dispersion of the arylene sulfide polymer vary widely, but generally it is preferred to have 5 to 40 weight percent arylene sulfide polymer based on the total weight of the liquid and solids.

In embodiments where pigments or fillers are present they are generally used in a ratio of about 1 to 100 parts, preferably 25 to 50 parts by weight per 100 parts by weight of the poly(arylene sulfide).

The fluorocarbon polymer dispersion comprises charged fluorocarbon polymer particles in a liquid such as water. Preferably the particles have a negative charge. The fluorocarbon dispersion generally will also contain a surface active agent, preferably a non-ionic surface active agent which can be identical to the one used in the preparation of the arylene sulfide polymer dispersion. Particle size of the fluorocarbon polymer is 40 mesh or smaller although generally the particle size will be much smaller, much preferably in the range of 0.02 to 20, preferably 0.05 to 5 microns average diameter. A particularly preferred dispersion is that sold by du Pont under the trademark Teflon 30-B which is a negatively charged hydrophobic colloid containing TFE resin particles 0.05 to 0.5 microns in size, suspended in water. The dispersion contains 59–61 percent solids by weight and is stabilized with 5.5 to 6.5 weight percent of a non-ionic wetting agent (based on weight of resin). pH is normally about 10 and the viscosity at room temperature is approximately 15 centipoises. Generally the amount of non-ionic surface active agent in the fluorocarbon polymer dispersion will be in the range of 1 to 20 preferably 4 to 10 weight percent based on the amount of fluorocarbon polymer.

The ratio of fluorocarbon polymer to liquid generally will be in the range of 15 to 65, preferably 30 to 65 weight percent solids based on the total weight of the dispersion.

The two dispersions are mixed preferably by slowly adding the poly(arylene sulfide) slurry to the fluorocarbon polymer dispersion with continuous gentle mixing until the desired amount of arylene sulfide polymer is incorporated into the composition. This allows the production of compositions having relatively large amounts of fluorocarbon polymer in relation to the arylene sulfide polymer. It is possible to produce compositions having a weight ratio of arylene sulfide polymer to fluorocarbon polymer of 0.1:1 to 40:1, preferably 0.25:1 to 10:1. It is essential to avoid high intensity mixing at this point as such may tend to coagulate the fluorocarbon polymer dispersion.

The final dispersion can be applied to a substrate by any conventional means such as spraying, or with adaptor blade or the like.

The resulting coating can be cured, for instance by heating to a temperature of at least 500°F, preferably 600 to 850°F for at least 5 minutes, preferably 15 minutes to 2 hours. The coatings can be cured at the higher temperatures with the shorter time.

EXAMPLE

A series of coating formulations were made utilizing poly(phenylene sulfide) having an inherent viscosity of about 0.15 as determined by using 0.25 percent of the sample in chloronaphthalene at 206°C. The poly(phenylene sulfide) had a particle size of less than 60 mesh. 100 grams of the poly(phenylene sulfide) designated PPS was ball milled for approximately 15 hours with sufficient water containing 1 percent Triton X-100 non-ionic wetting agent to give 25 weight percent total solids. In most of the formulations a pigment was also present as the poly(phenylene sulfide) was ball milled. The resulting dispersion was then slowly stirred into a commercial aqueous dispersion of polytetrafluorethylene (PTFE) sold under the trademark Teflon 30-B. The resulting stable suspension was sprayed on steel test plates, cured at 200°F for 30 minutes and examined. The parts by weight of pigment and TFE in the final composition were as follows.

CALCULATED ILLUSTRATIVE EMBODIMENT 100 grams of poly(phenylene sulfide) identical to that of the Example are ball milled 15 hours with 300 grams water containing 1 percent Triton X-100 wetting agent. The resulting dispersion is then stirred slowly into an identical PTFE dispersion to that of the Example to give a composition having 200 grams of PTFE to 100 grams of poly(phenylene sulfide). The composition is sprayed onto a substrate and cured to give a smooth tightly adhered coating.

CONTROL

A series of runs were made in which granular PTFE powder was ground in a ball mill to an aqueous slurry and thereafter poly(phenylene sulfide) and pigment added and the ball milling continued until a smooth coating could be obtained. The results were as follows.

100 PPS/33 TiO$_2$/10 PTFE (Teflon 5) 48 hrs. milling time
100 PPS/60 FE$_3$O$_4$/300 PTFE (Teflon 5) 15 days milling time, surface rough
100 PPS/33 TiO$_2$/40 PTFE (Halon G-80) 15 days milling time
100 PPS/45TiO$_2$/5 carbon/50 PTFE (Teflon 5) 19 days milling time, surface still rough As can be seen, the dispersion still did not give acceptable coatings after the extended milling times except with low amounts of the fluorocarbon.

While this invention has been described in detail for the purpose of illustration, it is not to be construed as limited thereby but is intended to cover all changes and modifications within the spirit and scope thereof.

I claim:

1. Process for preparing a coating composition comprising: subjecting a particulate arylene sulfide polymer to intensive milling in a liquid with a non-ionic surface active agent; and thereafter mixing the thus formed dispersion with a dispersion of a particulate fluorocarbon polymer in a liquid, the particles of said fluorocarbon polymer having an electrical charge.

2. Method according to claim 1 wherein said liquid in which said arylene sulfide polymer is dispersed and said liquid in which said fluorocarbon polymer is dispersed is water.

3. Method according to claim 2 wherein said poly(arylene sulfide) is ball milled for a time within range of 5 to 40 hours.

4. Method according to claim 2 wherein said fluorocarbon polymer has a negative charge.

| Run | PPS | TiO | FeO | Carbon | TFE | Coating appearance |
|---|---|---|---|---|---|---|
| 1 | 100 | | 50 | | 300 | Smooth, microscopic cracks, fair adhesion. |
| 2* | 100 | 50 | | | 150 | Good – fair adhesion. |
| 3 | 100 | 50 | | | 100 | Good, smooth, microscopic cracks – tightly bonded. |
| 4 | 100 | | 50 | | 33 | Good, smooth – practically crack free. |
| 5 | 100 | | 50 | | 50 | Good, smooth – very small microscopic cracks. |
| 6** | 100 | 50 | | | 45 | Very smooth – no cracks. |
| 7** | 100 | 40 | | 10 | 50 | Very flat black, generally good, very fine cracks in few spots. |
| 8 | 100 | | 33 | | 33 | Cracks and slightly rough, but good adhesion. |
| 9 | 100 | 50 | | 5 | 50 | Smooth feel – very flat black. |
| 10 | 100 | 25 | ***8 | | 33 | Even smooth coating. |
| 11 | 100 | 100 | | | 400 | Smooth even coating – well bonded. |
| 12 | 100 | 100 | | | 200 | Smooth even coating – well bonded. |
| 13 | 100 | 33 | | | 10 | Smooth even coating. |
| 14 | 100 | 33 | | | 15 | Smooth even coating – good adhesion. |

*Sprayed through 150 mesh screen.
**1.5 wt. percent based on water of Veegum, an aluminum silicate dispersant.
***Fe$_2$O$_3$.

5. Method according to claim 4 wherein said fluorocarbon polymer is polytetrafluoroethylene and wherein said fluorocarbon polymer dispersion contains a non-ionic surface active agent.

6. Method according to claim 2 wherein said arylene sulfide polymer has a particle size of 30 mesh or smaller and said fluorocarbon polymer has a particle size of 0.02 to 20 microns.

7. Method according to claim 6 wherein said fluorocarbon polymer dispersion comprises in addition a non-ionic surface active agent.

8. Method according to claim 7 wherein said arylene sulfide polymer is poly(phenylene sulfide) and said fluorocarbon polymer is polytetrafluoroethylene.

9. Method according to claim 2 wherein the weight ratio of said arylene sulfide to fluorocarbon polymer in the final composition is within the range of 0.25:1 to 10:1.

10. Method according to claim 9 wherein said arylene sulfide polymer is poly(phenylene sulfide), said fluorocarbon polymer is polytetrafluoroethylene, said intensive milling comprises ball milling for a time period within the range of 5 to 40 hours and wherein a pigment is present during said ball milling.

\* \* \* \* \*